(12) United States Patent
Fukuda et al.

(10) Patent No.: US 8,665,229 B2
(45) Date of Patent: Mar. 4, 2014

(54) SETTLEMENT TERMINAL AND CONTROLLING METHOD OF THE SAME

(75) Inventors: Junpei Fukuda, Shizuoka (JP); Yasutsugu Sasaki, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 827 days.

(21) Appl. No.: 12/859,681

(22) Filed: Aug. 19, 2010

(65) Prior Publication Data

US 2011/0051184 A1 Mar. 3, 2011

(30) Foreign Application Priority Data

Aug. 25, 2009 (JP) ................................ 2009-194681

(51) Int. Cl.
*G06F 3/041* (2006.01)

(52) U.S. Cl.
USPC .................................. 345/173; 235/2; 705/16

(58) Field of Classification Search
USPC .............. 345/173–184; 705/16–25; 235/2–28
See application file for complete search history.

(56) References Cited

U.S. PATENT DOCUMENTS

| | | | |
|---|---|---|---|
| 2002/0087478 A1* | 7/2002 | Hudd et al. ...................... | 705/64 |
| 2003/0004812 A1 | 1/2003 | Kasasaku | |
| 2007/0247643 A1 | 10/2007 | Nakamura et al. | |
| 2007/0255665 A1* | 11/2007 | Oosugi et al. ................. | 705/414 |
| 2008/0052176 A1* | 2/2008 | Buchheit ......................... | 705/17 |
| 2008/0192016 A1 | 8/2008 | Terase | |
| 2008/0237360 A1 | 10/2008 | Hokazono et al. | |
| 2009/0061947 A1* | 3/2009 | Park et al. ...................... | 455/566 |
| 2010/0078471 A1* | 4/2010 | Lin et al. ........................ | 235/379 |

FOREIGN PATENT DOCUMENTS

| | | |
|---|---|---|
| CN | 200580049179.9 | 3/2008 |
| CN | 200810088521.1 | 10/2008 |
| JP | 5-33291 | 4/1993 |
| JP | 09-062446 | 3/1997 |
| JP | 2002-074508 | 3/2002 |
| JP | 2003-016536 | 1/2003 |
| JP | 2004086733 | 3/2004 |
| JP | 2007-323419 | 12/2007 |

OTHER PUBLICATIONS

Notification of the First Office Action for Chinese Patent Application No. 201010262390.1 Dated Nov. 21, 2012, 26 pgs.
Japanese Office Action for Japanese Patent Application Serial No. 2009-194681 mailed on Jan. 17, 2012.
Japanese Office Action for Japanese Patent Application Serial No. 2009-194681 mailed on Jun. 28, 2011.

* cited by examiner

*Primary Examiner* — Liliana Cerullo
(74) *Attorney, Agent, or Firm* — Turocy & Watson, LLP

(57) ABSTRACT

According to one embodiment, when a touch position on a touch panel-type display section corresponds to an image pattern for an operation, the display of the image pattern is changed to the display of the image pattern in a different display form. When the touch is released in this state, the information of the image pattern that is touched is used as an input and processing based on the input information is executed.

15 Claims, 11 Drawing Sheets

SETTLEMENT TERMINAL AND CONTROLLING METHOD OF THE SAME

CROSS-REFERENCE TO RELATED APPLICATION

This application is based upon and claims the benefit of priority from Japanese Patent Application No. 2009-194681, filed on Aug. 25, 2009, the entire contents of which are incorporated herein by reference.

FIELD

Embodiments described herein relate generally to a small-sized settlement terminal and a controlling method of the same.

BACKGROUND

A settlement terminal used for sales of articles has a display section, an operation section, a card reader and the like.

An operator in a store inputs a sales price by key operation in the operation section, designates the type of a card for payment presented by a customer, by key operation in the operation section, and selects a payment condition for the designated card by key operation in the operation section.

A smaller size and good operability are demanded of such a settlement terminal.

DETAILED DESCRIPTION

In general, according to one embodiment, a settlement terminal includes:

a touch panel-type display section which displays at least one image pattern;

a change control section which, when the display section is touched, changes a display of an image pattern situated at the touch position to a display of the image pattern in a different display form;

a determination section which determines whether or not a display zone of the image pattern situated at an initial position of the touch when the display section is touched is the same as a display zone of an image pattern situated at a final position of the touch when the touch is released from the display section; and a processing section which uses information of the image pattern displayed at the final position of the touch as an input when a result of the determination by the determination section is positive when the touch is released from the display section, and executes processing based on the input information.

Hereinafter, an embodiment of the invention will be described with reference to the drawings.

Figure 1:
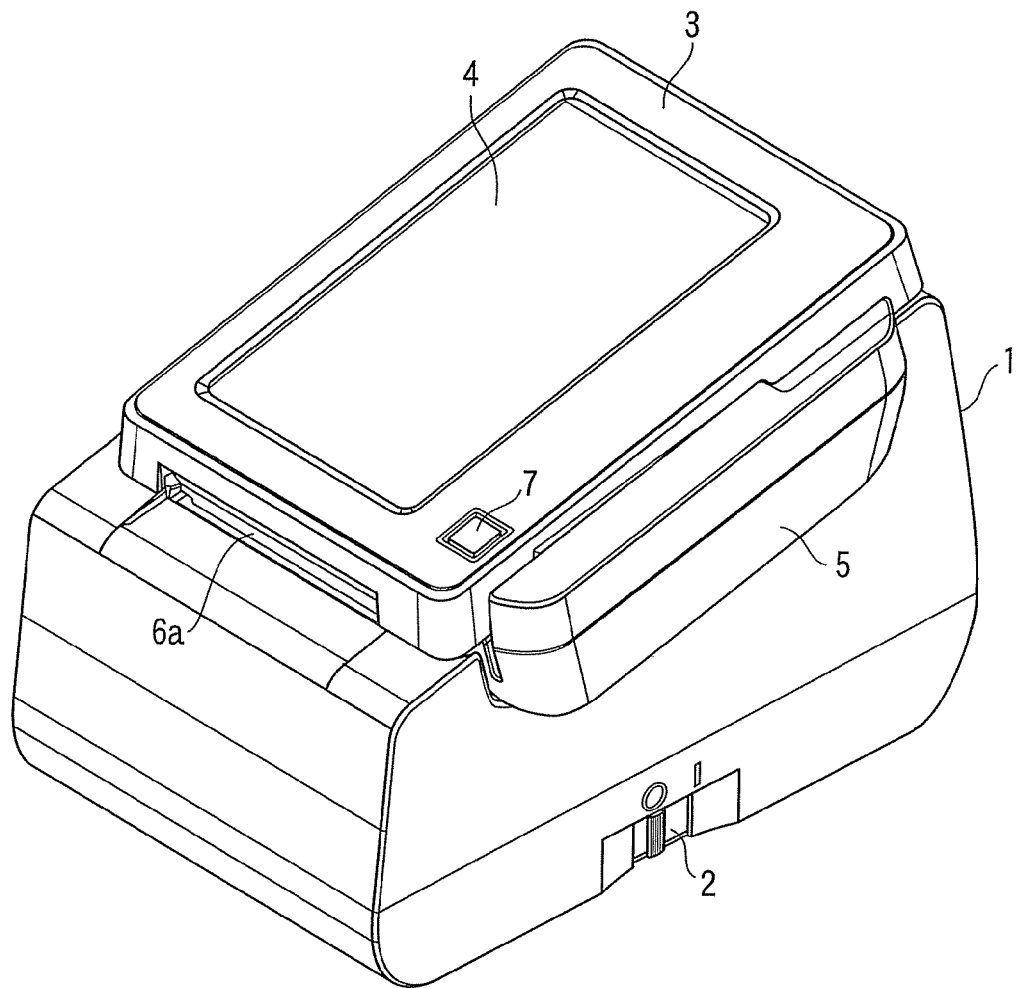
FIG. 1 is a perspective view showing the appearance of the body according to an embodiment.

In FIG. 1, numeral 1 represents the body of a small-sized settlement terminal. This body 1 is installed on a checkout counter or the like in a store together with a POS terminal or an electronic register. The body 1 also has a power switch 2 in a lateral part and a top unit 3 which can freely open and close. The top unit 3 has a rectangular touch panel-type display section 4 on the top side, a card reader 5 in a lateral part, a paper discharge port 6a of a printer 6 which will be described later, on a bottom edge, and a reset button 7 at a position beside the display section 4 on the top side.

As a card for settlement presented by a customer, for example, a credit card or a debit card, is inserted and slid in the card reader 5, the card reader 5 reads data recorded on the card. The printer 6 exists within the body 1 or within the top unit 3. The printer 6 prints settlement information based on a touch operation in the display section 4 and the information read by the card reader 5 on a rolled sheet housed in the body 1, then cuts the printed rolled sheet as a receipt, and discharges the receipt from the paper discharge port 6a. The reset button 7 is to clear the input information in the display section 4 and the information read by the card reader 5.

Figure 2:
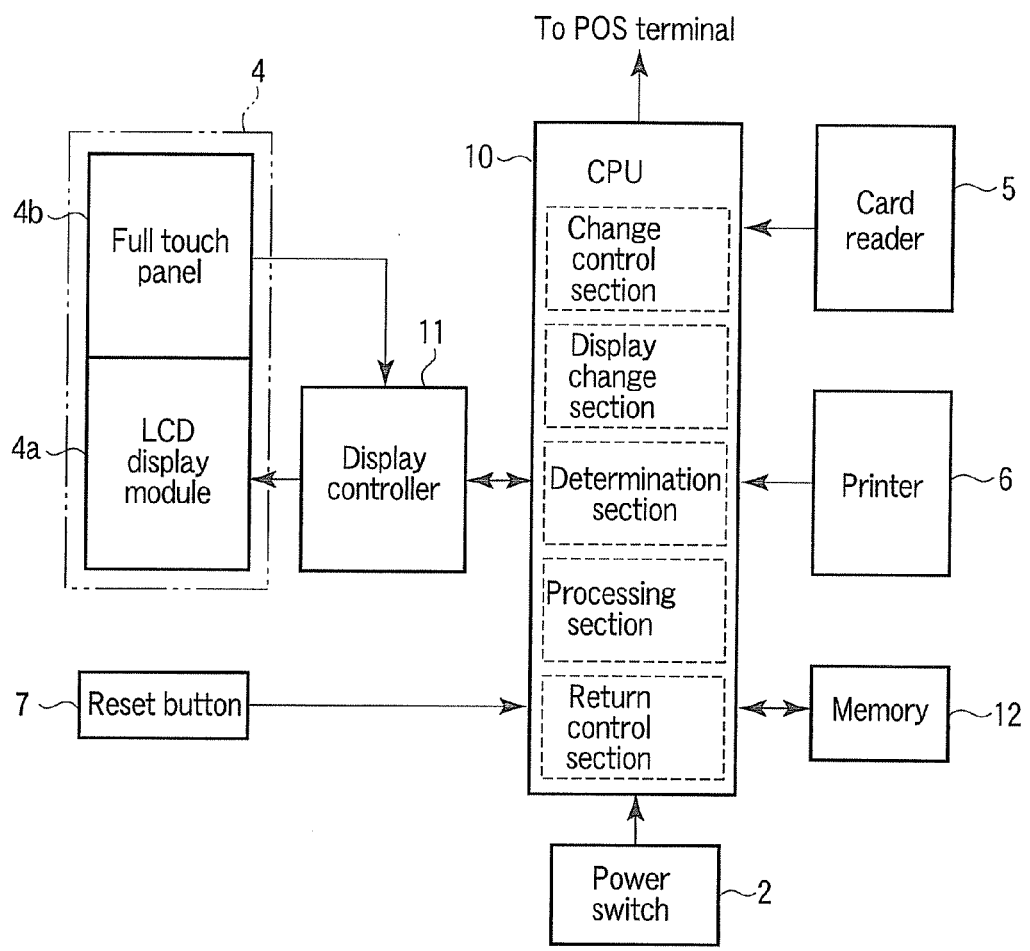
FIG. 2 is a block diagram showing a control circuit according to the embodiment.

FIG. 2 shows a control circuit in the body 1 and the top unit 3.

The display section 4 has an LCD display module 4a which can display a color image and a full touch panel 4b arranged on the LCD display module 4a, and functions as a graphical user interface (GUI).

The power switch 2, the card reader 5, the printer 6, the reset button 7, a display controller 1, and a memory 12 are connected to a CPU 10 of a microcomputer which functions as a main control unit.

The display controller 11 causes the LCD display module 4a in the display section 4 to display various operation screens generated by the CPU 10. Also, when the full touch panel 4b in the display section 4 is touched, the display controller 11 supplies the display content on the LCD display module 4a corresponding to the touch position to the CPU 10 as input information.

The memory 12 stores a control program which is necessary for the control of the CPU 10, various kinds of image pattern information to generate the various operation screens, and coordinate information to designate a display zone for the image pattern information on the LCD display module 4a, or the like.

The CPU 10 has the following sections (1) to (5) as its main functions.

(1) A display control section which sequentially generates plural operation screens that are necessary for settlement of article sales on the basis of the image pattern information and coordinate information in the memory 12 and displays the generated respective operation screens on the LCD display module 4a in the display section 4.

(2) A change control section which, when the display section 4 is touched, changes the display of the image pattern situated at the touch position, of the image patterns within the operation screen displayed in the display section 4, to the display of the image pattern in a different display form.

(3) A determination section which determines whether or not the display zone of the image pattern situated at the initial position of the touch when the display section 4 is touched is the same as the display zone of the image pattern situated at the final position of the touch when the touch is released from the display section 4.

(4) A processing section which uses the information of the image pattern displayed at the final position of the touch as an input when the result of the determination by the determination section is positive when the touch is released from the display section 4, and executes processing based on the input information.

(5) A return control section which returns the display of the image pattern situated at the initial position of the touch to the display of the image pattern before the change by the change control section, when the result of the determination by the determination section is negative when the touch is released from the display section 4.

Figure 3:
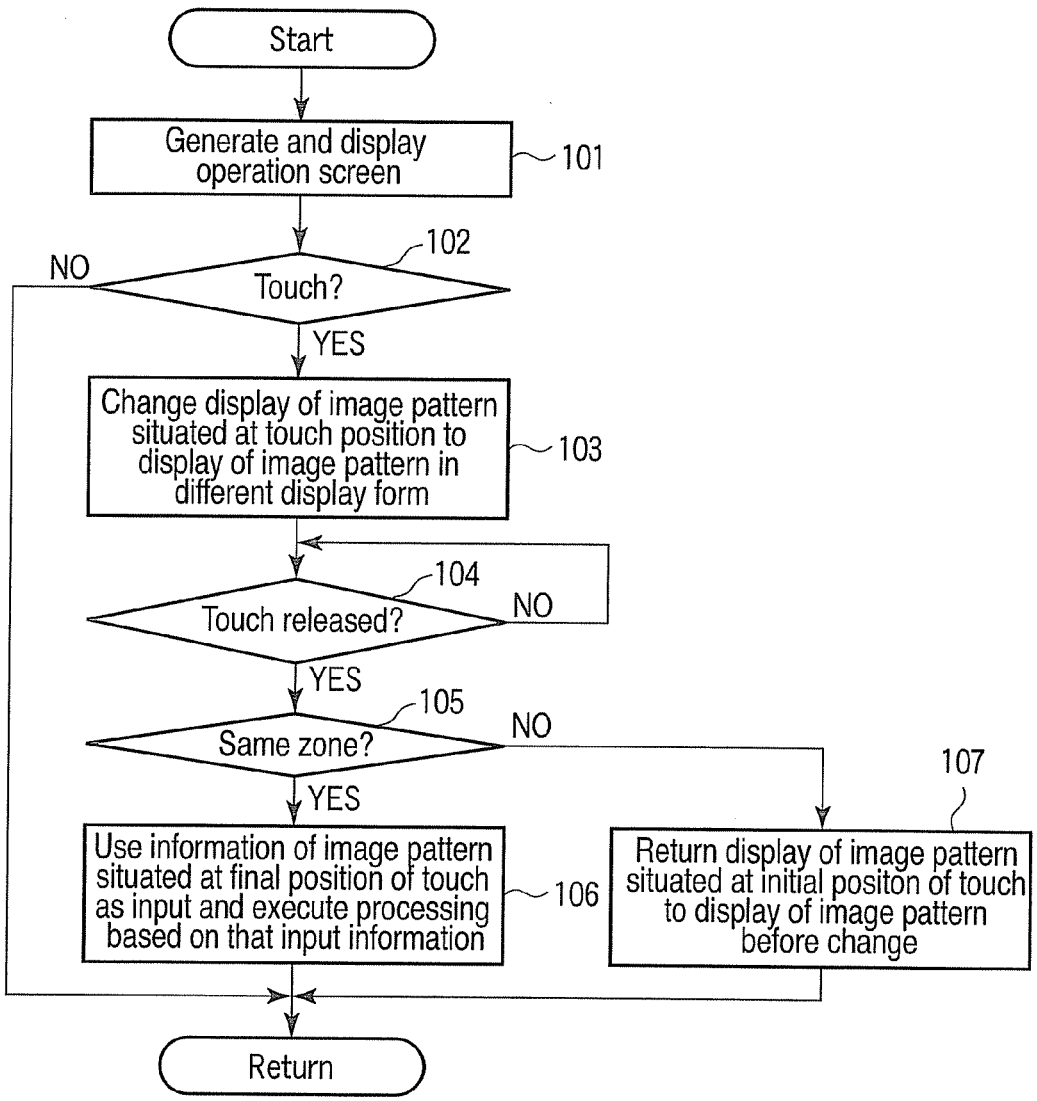
FIG. 3 is a flowchart for explaining the operation of the embodiment.

Next, the operation will be described with reference to the flowchart of FIG. 3.

Figure 4:
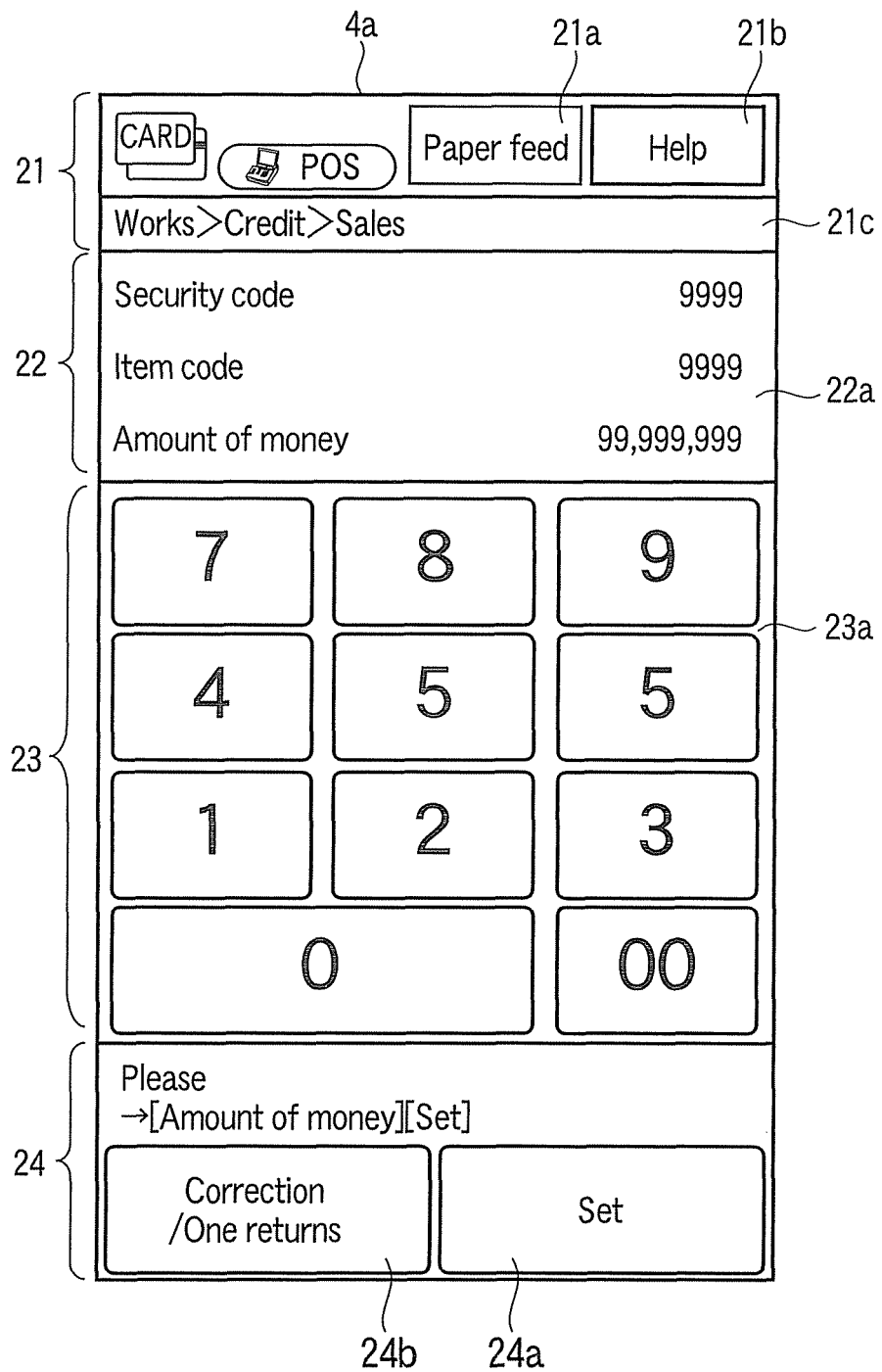
FIG. 4 shows a ten-key operation screen according to the embodiment.

When the power switch 2 is turned on, the CPU 10 generates a ten-key operation screen shown in FIG. 4 as an operation screen that is necessary for settlement of article sales on the basis of the image pattern information and coordinate information in the memory 12, and displays generated ten-key operation screen on the full touch panel 4*b* in the display section 4 (ACT 101).

The ten-key operation screen has a first information display area 21, a second information display area 22, an information input area 23 and a set key display area 24 which are set in order in the direction orthogonal to the direction of the width of the display zone of the LCD display module 4*a*.

The large information input area 23 at the center includes the display of a ten-key image pattern 23*a* including large image patterns of plural numeric keys "0", "00", "1", "2", . . . "9" to the full extent of the area. The first information display area 21 at the top position includes the display of a paper feed key image pattern 21*a*, a help key image pattern 21*b*, and function information 21*c* about the small-sized settlement terminal. The second information display area 22 at the second position from the top includes the display of numeric information 22*a* such as security code, item code, and amount of money. The set key display area 24 at the bottom position includes the display of a set key image pattern 24*a* and a correction key image pattern 24*b* or the like.

When an article which a customer wants to purchase is brought to the checkout counter, the operator in the store inputs the amount of money by touching, with fingers, various numeric keys of the ten-key image pattern 23*a* displayed in the display section 4, and touches the set key image pattern 24*a* in the set key display area 24 to finalize the inputted amount. The operator then inserts a credit card or debit card presented by the customer into the card reader 5 to read the card. The CPU 10 transmits the inputted amount information and the information read by the card reader 5 to a POS terminal that is of higher order. The POS terminal executes settlement of article sales based on the amount information and the read information transmitted from the CPU 10 and transmits the settlement information to the CPU 10. The CPU 10 receives the settlement information from the POS terminal and prints out the settlement information by the printer 6.

Figure 5:
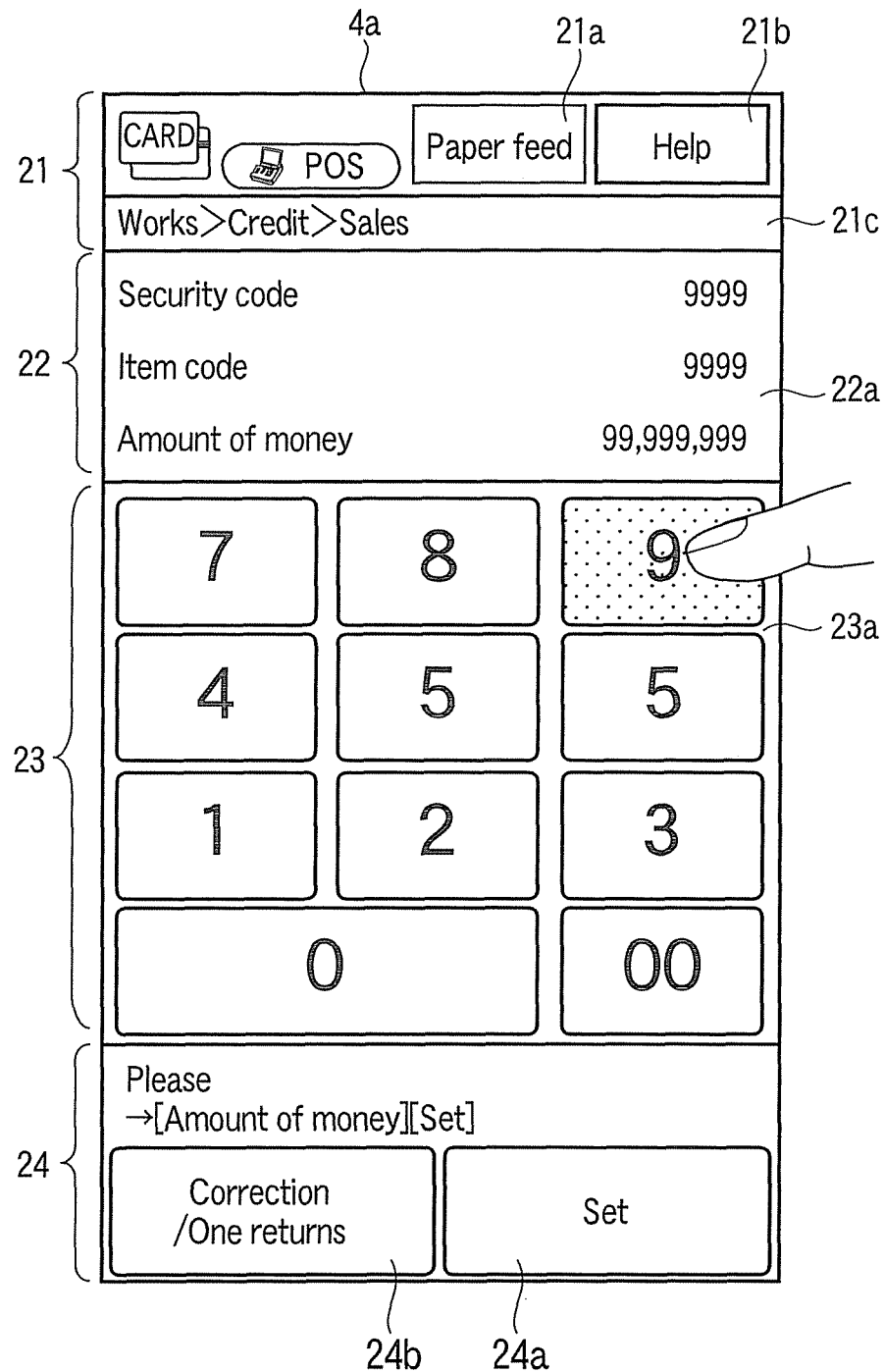
FIG. 5 shows the state where the ten-key operation screen of FIG. 4 is touched.

When the ten-key image pattern 23*a* of the information input area 23 in the ten-key operation screen is touched (YES in ACT 102), the CPU 10 changes the display of the numeric key that is touched, for example, a numeric key "9", from the display of the image pattern of the numeric key "9" in a color indicating the non-touched state to the display of the image pattern of the numeric key "9" in a different color indicating the touched state (as indicated by dots) as shown in FIG. 5 (ACT 103). This change in display form enables the operator to easily and accurately grasp that the operator is touching the numeric key "9".

When the touch is released from the numeric key "9" (YES in ACT 104), the CPU 10 determines whether the display zone of the image pattern situated at the initial position of the touch is the same as the display zone of the image pattern situated at the final position (ACT 105). When the result of the determination is positive (YES in ACT 105), the CPU 10 inputs the information "9" of the image pattern situated at the final position of the touch and displays the numeric value "9" in the information display area 21 on the ten-key operation screen as processing based on the input information (ACT 106).

Also when the set key image pattern 24*a* is touched (YES in ACT 102), the CPU 10 changes the display of the set key image pattern 24*a* that is touched, from the display of the set key image pattern 24*a* in a color indicating the non-touched state to the display of the set key image pattern 24*a* in a different color indicating the touched state (ACT 103).

When the touch is released from the set key image pattern 24*a* (YES in ACT 104), the CPU 10 determines whether the display zone of the image pattern situated at the initial position of the touch is the same as the display zone of the image pattern situated at the final position (ACT 105). When the result of the determination is positive (YES in ACT 105), the CPU 10 uses the information of the image pattern situated at the final position of the touch, that is, the information of the set key image pattern 24*a*, as input information, and executes processing based on the input information (ACT 106). That is, the CPU 10 generates a card designation screen shown in FIG. 6 as an operation screen for the next processing on the basis of the image pattern information and coordinate information in the memory 12 and displays the generated card designation screen on the LCD display module 4*a* instead of the ten-key operation screen (ACT 101).

The card designation screen includes the display of an array of a work tab image pattern 31, a total tab image pattern 32, a setting tab image pattern 33, a practice tab image pattern 34, and a re-print tab image pattern 35 at coordinate positions along the left edge below the information display area 21, of the coordinates in the entire display zone of the LCD display module 4*a*. The card designation screen also includes the display of an array of a credit key image pattern 36, a debit key image pattern 37, and a card key image pattern 38 at coordinate positions beside these tab image patterns. The card designation screen further includes the display of page scroll key image patterns 41 and 42 at coordinate positions at the bottom.

Figure 7:
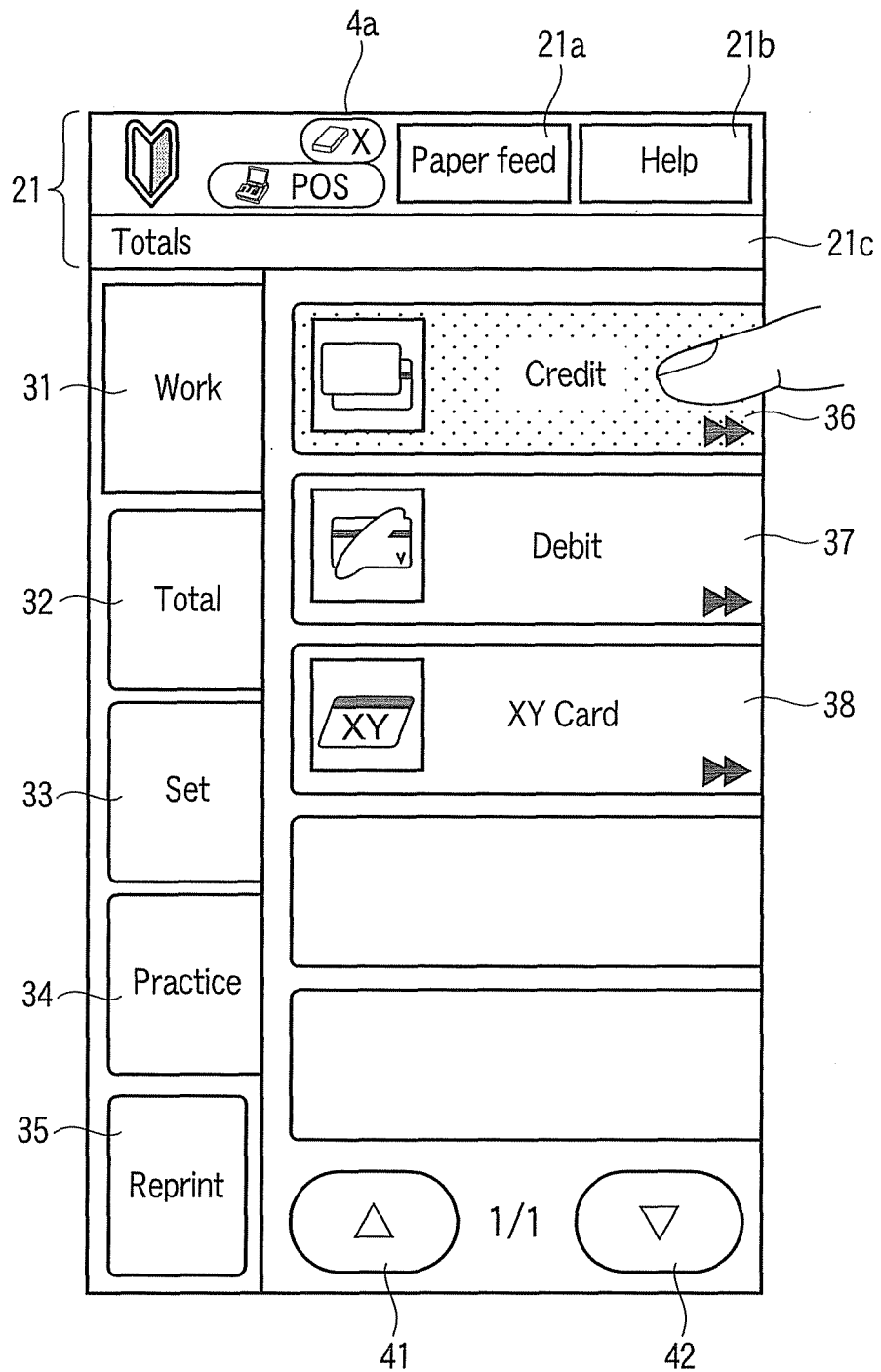
FIG. 7 shows the state where the card designation screen of FIG. 6 is touched.

When, for example, the credit key image pattern 36 is touched in the card designation screen (YES in ACT 102), the CPU 10 changes the display of the credit key image pattern 36 from the display of the credit key image pattern 36 in a color indicating the non-touched state to the display of the credit key image pattern 36 in a different color indicating the touched state (indicated by dots) as shown in FIG. 7 (ACT 103). This change in display form enables operator to easily and accurately grasp that the operator is touching the credit key image pattern 36.

Figure 8:
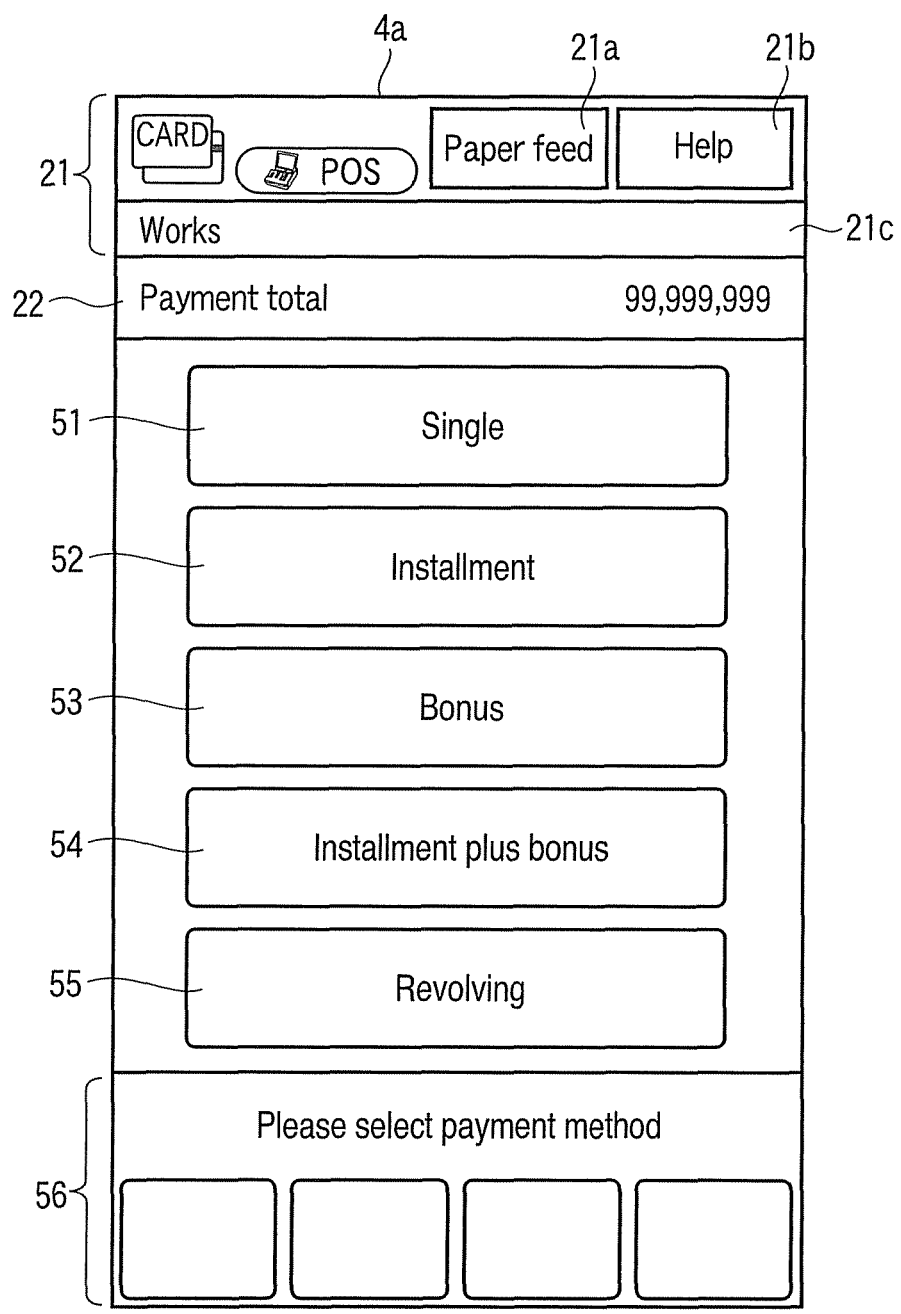
FIG. 8 shows a payment condition selection screen according to the embodiment.

When the touch is released from the credit key image pattern 36 (YES in ACT 104), the CPU 10 determines whether the display zone of the image pattern situated at the initial position of the touch is the same as the display zone of the image pattern situated at the final position (ACT 105). When the result of the determination is positive (YES in ACT 105), the CPU 10 uses the information of the image pattern situated at the final position of the touch, that is, the credit card designation information of the credit key image pattern 36, as input information, and executes processing based on the input information (ACT 106). That is, the CPU 10 generates a payment condition selection screen shown in FIG. 8 as an operation screen for the next processing on the basis of the image pattern information and coordinate information in the memory 12 and displays the generated payment condition selection screen on the LCD display module 4*a* instead of the card designation screen (ACT 101).

The payment condition selection screen includes the display of an array of a single payment key image pattern 51, an installment payment key image pattern 52, a payment by bonus key image pattern 53, a payment by installment plus bonus image pattern 54, and a revolving payment key image pattern 55 at coordinate positions below the information display areas 21 and 22, of the entire display zone of the LCD display module 4*a*. The payment condition selection screen also has a guide text display area 56 at a coordinate position at the bottom.

Figure 9:
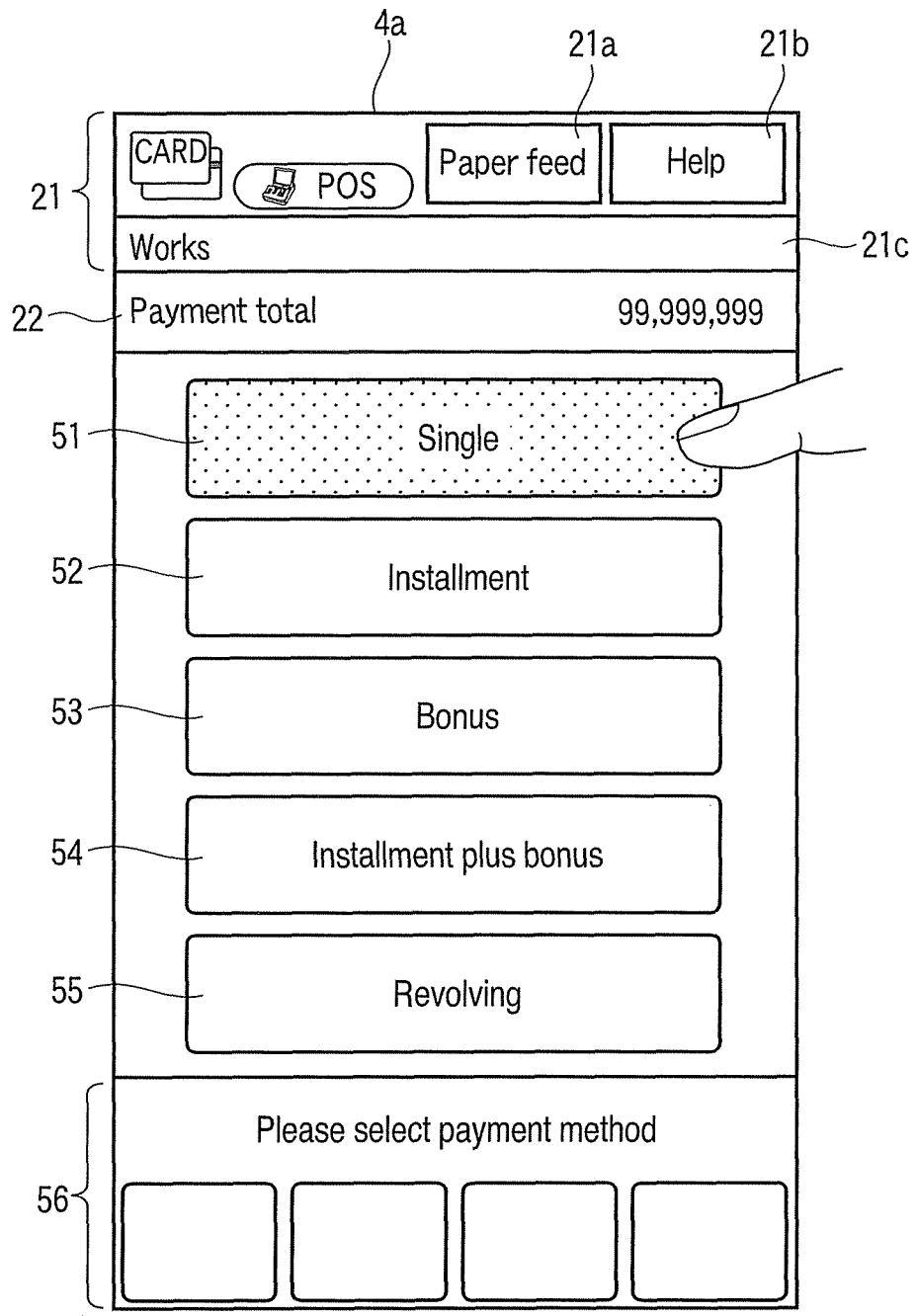
FIG. 9 shows the state where the payment condition selection screen of FIG. 8 is touched.

When, for example, the single payment key image pattern 51 is touched in the payment condition selection screen (YES in ACT 102), the CPU 10 changes the display of the single payment key image pattern 51 from the display of the single payment key image pattern 51 in a color indicating the non-touched state to the display of the single payment key image pattern 51 in a different color indicating the touched state (indicated by dots) as shown in FIG. 9 (ACT 103). This change in display form enables the operator to easily and accurately grasp that the operator is touching the single payment key image pattern 51.

Figure 10:
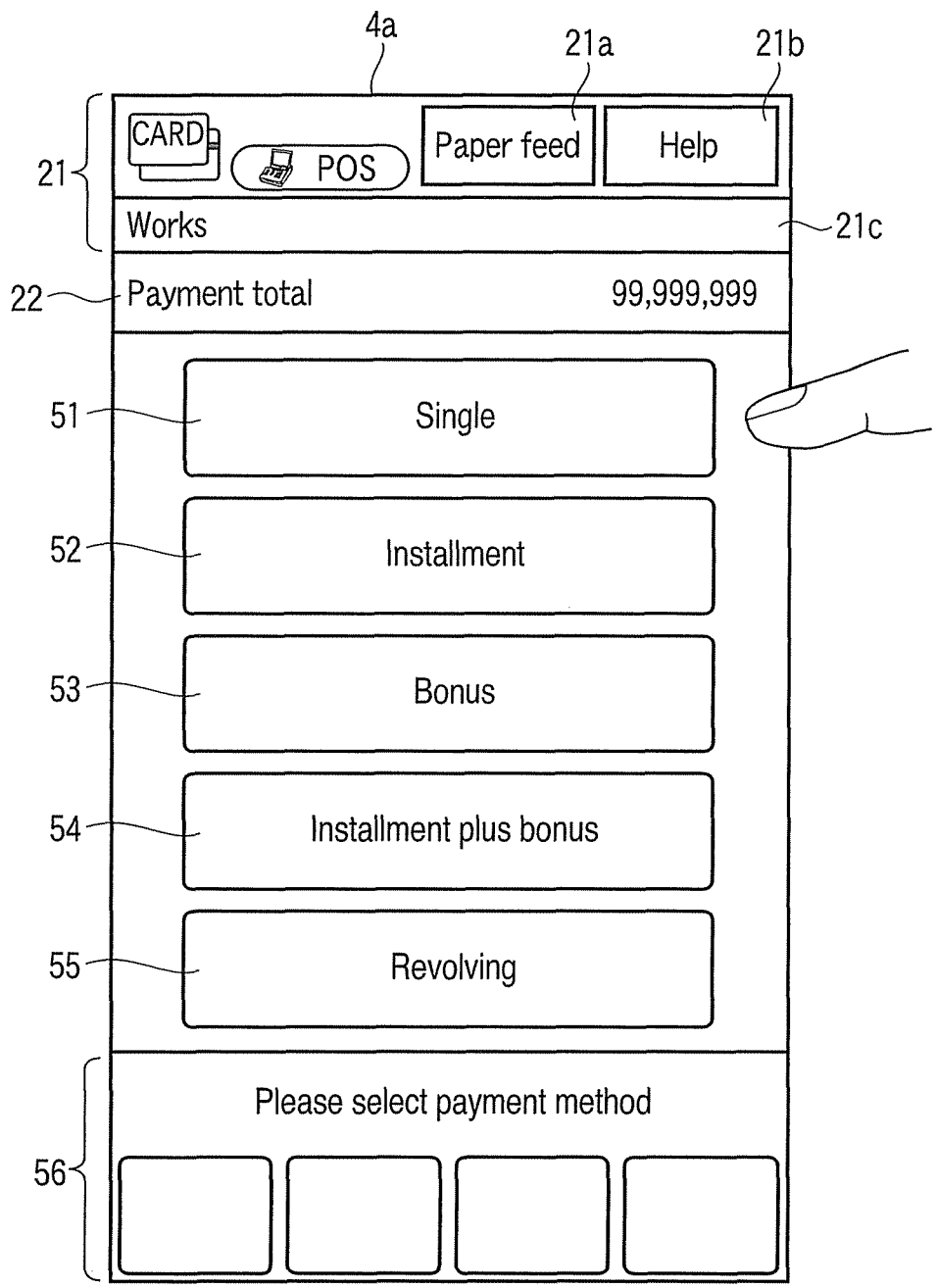
FIG. 10 shows the state where the touch on the payment condition selection screen of FIG. 8 is slid.

In some cases, the operator may mistakenly touch the single payment key image pattern 51 despite the operator's intention to touch the installment payment key image pattern 52. In some other cases, the operator may want to suspend the touch operation on the single payment key image pattern 51. In these cases, the operator slides the touch position out of the single payment key image pattern 51, as shown in FIG. 10.

When the slid touch is released from the full touch panel 4*b* (YES in ACT 104), the CPU 10 determines whether the display zone of the image pattern situated at the initial position of the touch is the same as the display zone of the image pattern situated at the final position (ACT 105). In this case, the initial position of the touch is on the single payment key image pattern 51 and the final position of the touch is out of the single payment key image pattern 51 and therefore the result of the determination is negative.

When the result of the determination is negative (NO in ACT 105), the CPU 10 returns the display of the image pattern situated at the initial position of the touch, that is, the display of the single payment key image pattern 51, from the display of the single payment key image pattern 51 in the color indicating the touched position (indicated by dots) to the display of the single payment key image pattern 51 in the original color indicating the non-touched state (ACT 107).

Figure 11:
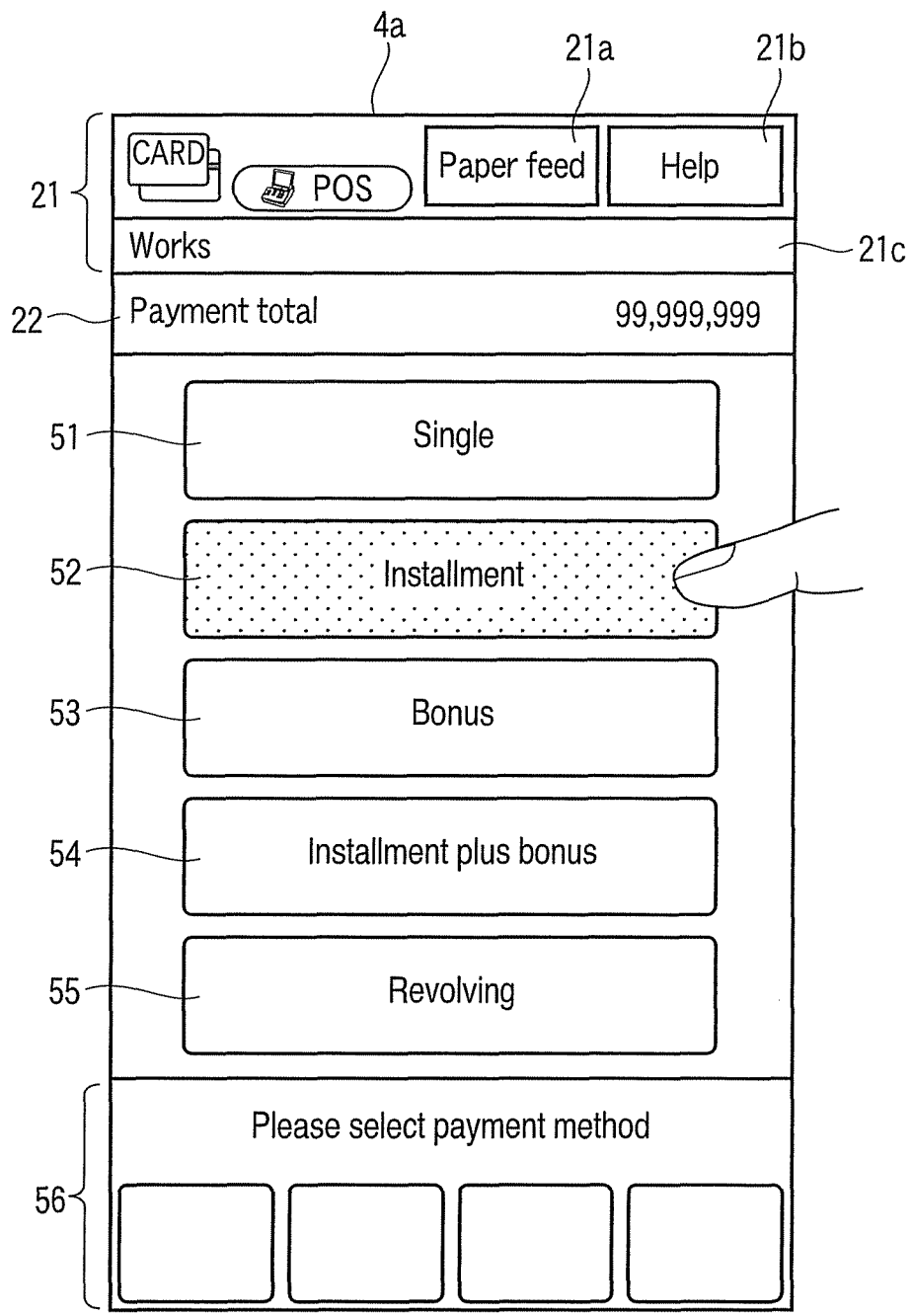
FIG. 11 shows the state where the touch on the payment condition selection screen of FIG. 8 is slid and corresponds to another key image pattern.

After that, when, for example, the installment payment key image pattern 52 is touched in the same payment selection screen, or when the touch position that is slid out of the single payment key image pattern 51 corresponds to the installment payment key image pattern 52 (YES in ACT 102), the CPU 10 changes the display of the installment payment key image pattern 52 from the display of the installment payment key image pattern 52 in a color indicating the non-touched state to the display of the installment payment key image pattern 52 in a different color indicating the touched state (indicated by dots) as shown in FIG. 11 (ACT 103). This change in display form enables the operator to easily and accurately grasp that the operator is touching the installment payment key image pattern 52.

When the touch is released from the installment payment key image pattern 52 (YES in ACT 104), the CPU 10 determines whether the display zone of the image pattern situated at the initial position of the touch is the same as the display zone of the image pattern situated at the final position (ACT 105). When the result of the determination is positive (YES in ACT 105), the CPU 10 uses the information of the image pattern situated at the final position of the touch, that is, the installment payment information of the installment payment key image pattern 52, as input information, and executes processing based on the input information (ACT 106).

Figure 6:
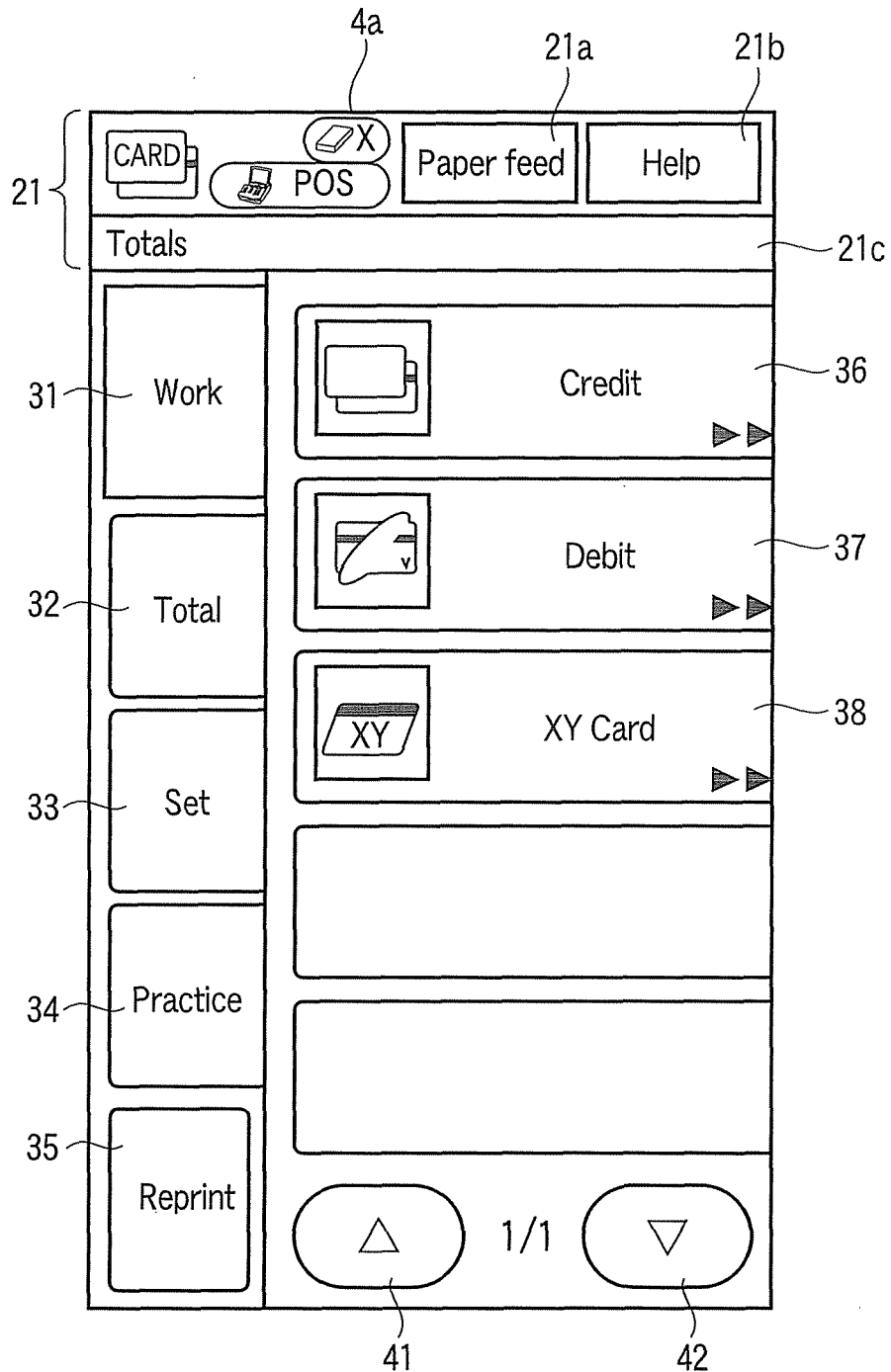
FIG. 6 shows a card designation screen according to the embodiment.

The processing by the CPU 10 in the case of sliding the touch position where there is an error in the touch position or the touch operation itself is to be suspended, not only can be executed in the payment condition selection screen but also can be similarly executed in the ten-key operation screen of FIG. 4 or the card designation screen of FIG. 6.

As the touch panel-type display section 4 including the LCD display module 4*a* and the full touch panel 4*b* is thus installed, a greater volume of information can be inputted even when the body 1 is small.

Particularly, when the touch on the display section 4 corresponds to an image pattern for an operation, the display of the image pattern situated at the touch position is immediately changed to the display of the image pattern in a different display form. Therefore, the operator can be notified easily and accurately whether the touch position is appropriate or not.

When the touch position is not on a desired image pattern or when the touch operation itself is to be suspended, the touch position is simply slid out of the image pattern and thus the display of the image pattern is returned from the display of the image pattern in the color indicating the touched state to the display of the image pattern in the original color indicating the non-touched state. Therefore, quick, errorless and appropriate re-operation is possible while erroneous input of information can be prevented. Thus, good operability can be secured.

The ten-key operation screen has the large information put area 23 at the center. The information input area 23 includes the display of the ten-key image pattern 23*a* including the large image patterns of plural numeric keys "0", "00", "1", "2", . . . "9" to the full extent of the area. Therefore, good operability can be secured in this respect as well.

In the above embodiment, a change in color is described as an example of a change in display form. However, the luminance of the display may be changed or the brightness of the display may be changed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A settlement terminal comprising:
a touch panel-type display section which displays at least one image pattern;
a display control section which generates an operation screen containing at least one image pattern that is necessary for settlement of article sales and displays the generated operation screen on the display section;
a change control section which, when the display section is touched, changes a display of an image pattern situated at the touch position to a display of the image pattern in a different display form;
a determination section which determines whether or not a display zone of the image pattern situated at an initial position of the touch when the display section is touched is the same as a display zone of an image pattern situated at a final position of the touch when the touch is released from the display section; and
a processing section which uses information of the image pattern displayed at the final position of the touch as an input when a result of the determination by the determination section is positive when the touch is released from the display section, and executes processing based on the input information,
wherein the display control section generates a ten-key operation screen, a card designation screen and a payment condition selection screen in order as the operation screen including the at least one image pattern that is necessary for settlement of article sales, and displays the ten-key operation screen, the card designation screen and the payment condition selection screen that are generated, in order on the display section; and
wherein the ten-key operation screen has: a first information display area including a display of a paper feed key image pattern and a help key image pattern; a second information display area including a display of at least an amount of money; a display information input area including a display of a ten-key image pattern made up of plural numeric key image patterns; and a set key display area including at least a set key image pattern.

2. The terminal of claim 1, further comprising a return control section which, when a determination result of the determination section is negative when the touch is released from the display section, returns the display of the image pattern situated at the initial position of the touch to the display of the image pattern before the change by the change control section.

3. The terminal of claim 1, wherein when the display section is touched, the change control section changes color of the display of the image pattern situated at the touch position.

4. The terminal of claim 1, wherein when the display section is touched, the change control section changes luminance of the display of the image pattern situated at the touch position.

5. The terminal of claim 1, wherein when the display section is touched, the change control section changes brightness of the display of the image pattern situated at the touch position.

6. The terminal of claim 1, further comprising a storage unit which stores various kinds of image pattern information to generate the operation screen
and coordinate information to designate a display zone of the image pattern information on the display section.

7. The terminal of claim 1, wherein the ten-key operation screen has: a first information display area including a display of a paper feed key image pattern, a help key image pattern, and function information;
a second information display area including a display of a security code, an item code, and an amount of money;
a display information input area including a display of a ten-key image pattern made up of plural numeric key image patterns; and
a set key display area including a display of a set key image pattern and a correction key image pattern.

8. The terminal of claim 1, wherein the card designation screen includes a display of a credit key image pattern, a debit key image pattern, a card key image pattern, and a page scroll key image pattern.

9. The terminal of claim 1, wherein the payment condition selection screen includes a display of a single payment key image pattern, an installment payment key image pattern, a payment by bonus key image pattern, a payment by installment plus bonus key image pattern, and a revolving payment key image pattern.

10. The terminal of claim 1, wherein the display section includes an LCD display module which can display a color image, and a full touch panel arranged on the LCD display module.

11. The terminal of claim 1, further comprising:
a card reader which reads information on a card for settlement; and
a printer which prints settlement information based on processing by the processing section and the information read by the card reader.

12. A controlling method for a settlement terminal including a touch panel-type display section, the method comprising:
generating a ten-key operation screen, a card designation screen and a payment condition selection screen in order as an operation screen including at least one image pattern that is necessary for settlement of article sales and displaying the ten-key operation screen, the card designation screen and the payment condition selection screen that are generated, in order on the display section;
when the display section is touched, changing a display of an image display situated at the touch position to a display of the image display in a different display form;
determining whether or not a display zone of the image situated at an initial position of the touch when the display section is touched is the same as a display zone of an image situated at a final position of the touch when the touch is released from the display section; and
using information of the image pattern displayed at the final position of the touch as an input when a result of the determination is positive when the touch is released from the display section, and executing processing based on the input information,
wherein the ten-key operation screen has: a first information display area including a display of a paper feed key image pattern and a help key image pattern; a second information display area including a display of at least an amount of money; a display information input area including a display of a ten-key image pattern made up of plural numeric key image patterns; and a set key display area including at least a set key image pattern.

13. A settlement terminal, comprising:
a touch panel-type display section which displays at least one image pattern;
a display control section which generates an operation screen containing at least one image pattern that is necessary for settlement of article sales and displays the generated operation screen on the display section;

a change control section which, when the display section is touched, changes a display of an image pattern situated at the touch position to a display of the image pattern in a different display form;

a determination section which determines whether or not a display zone of the image pattern situated at an initial position of the touch when the display section is touched is the same as a display zone of an image pattern situated at a final position of the touch when the touch is released from the display section; and a processing section which uses information of the image pattern displayed at the final position of the touch as input when a result of the determination by the determination section is positive when the touch is released from the display section, and executes processing based on the input information, wherein the display control section generates a ten-key operation screen, a card designation screen and a payment condition selection screen in order as the operation screen including the at least one image pattern that is necessary for settlement of article sales, and displays the ten-key operation screen, the card designation screen and the payment condition selection screen that are generated, in order on the display section; and wherein the payment condition selection screen includes a display of a single payment key image pattern, an installment payment key image pattern, a payment by bonus key image pattern, a payment by installment plus bonus key image pattern, and a revolving payment key image pattern.

14. The terminal of claim 13, wherein the display section includes an LCD display module which displays a color image, and a full touch panel arranged on the LCD display module.

15. The terminal of claim 13, further comprising:
a card reader which reads information on a card for settlement; and
a printer which prints settlement information based on processing by the processing section and the information read by the card reader.

* * * * *